G. R. WILSON.
INSECT PROOF CHEST.
APPLICATION FILED APR. 6, 1911.

1,015,984.

Patented Jan. 30, 1912.
2 SHEETS—SHEET 1.

WITNESSES

INVENTOR
By G. R. Wilson
E. B. Stocking  Attorney

G. R. WILSON.
INSECT PROOF CHEST.
APPLICATION FILED APR. 6, 1911.
1,015,984.
Patented Jan. 30, 1912.
2 SHEETS—SHEET 2.
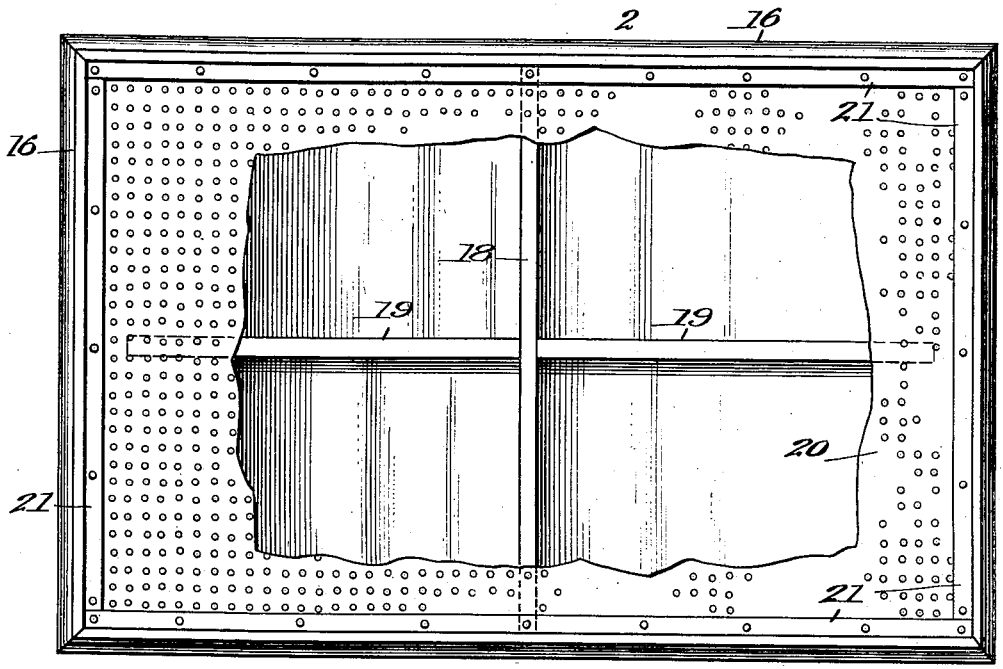
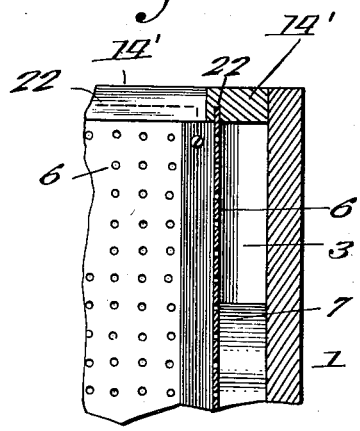
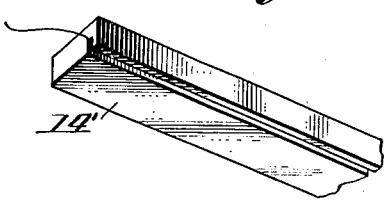
WITNESSES
INVENTOR
G. R. Wilson
Attorney

UNITED STATES PATENT OFFICE.

GEORGE R. WILSON, OF NEWPORT NEWS, VIRGINIA.

INSECT-PROOF CHEST.

1,015,984.  Specification of Letters Patent. Patented Jan. 30, 1912.

Application filed April 6, 1911. Serial No. 619,294.

*To all whom it may concern:*

Be it known that I, GEORGE R. WILSON, a citizen of the United States, residing at Newport News, county of Warwick, State of Virginia, have invented certain new and useful Improvements in Insect-Proof Chests, of which the following is a specification, reference being had therein to the accompanying drawing.

This invention relates to certain new and useful improvements in insect proof chests, the object being to provide a chest which is formed of any suitable material and yet will have the same insect repelling properties of cedar chests now employed for this purpose whereby the cost of manufacturing the chest is greatly reduced.

Another object of the invention is to provide a chest with a perforated lining spaced from the walls of the chest proper on the inside thereof so as to form a chamber or compartment in which cedar shavings, cedar sawdust, or any other suitable composition is adapted to be placed for protecting the contents of the chest from the ravages of insects.

A further object of the invention is to provide a chest in which the lining is secured in position therein in such a manner that a chamber will be formed entirely surrounding the inner walls of the chest, said chamber being adapted to contain insect repelling substance.

A still further object of the invention is to provide novel means for securing the lining within the body of the chest, the chamber formed by the lining and walls of the chest being closed at its upper end by detachable strips which may be readily removed in order to allow the renewal of the insect repelling substance.

Other and further objects and advantages of the invention will be hereinafter set forth and the novel features thereof defined by the appended claims.

Figure 1:
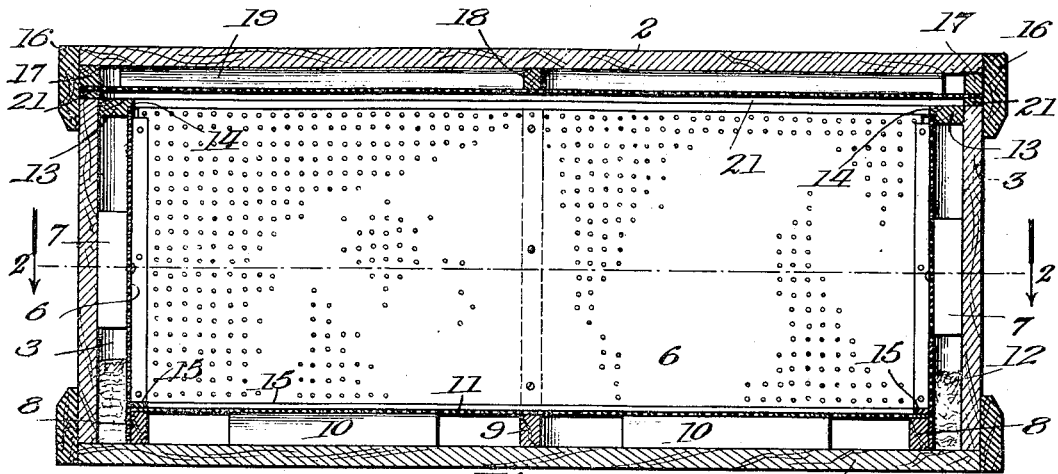
Figure 2:
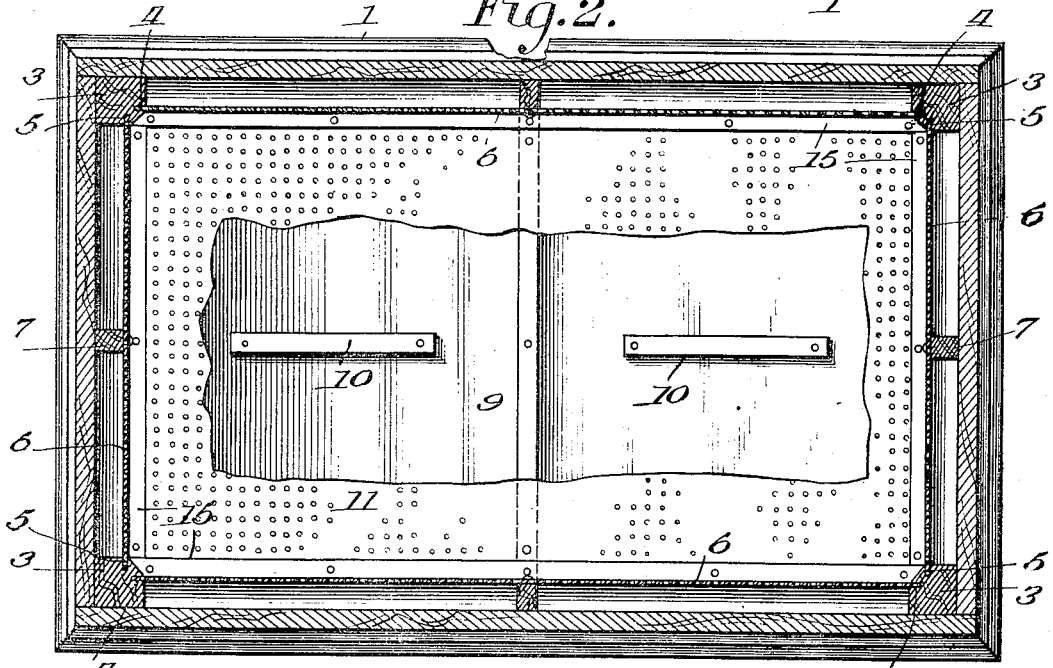
Figures 3, 4:
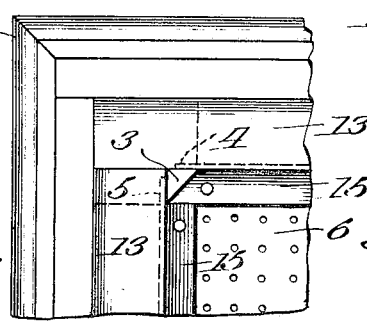

In the drawings—Figure 1 is a vertical longitudinal section through my improved chest; Fig. 2 is a horizontal section taken on line 2—2 of Fig. 1; Fig. 3 is a detail top plan view of a corner portion of the body of the chest; Fig. 4 is a detail perspective view of a portion of one of the strips for closing the chamber formed between the lining and walls of the chest; Fig. 5 is an inverted plan view of the cover partly broken away; Fig. 6 is a detail vertical section showing a slightly modified form of strip; and Fig. 7 is a perspective view of a portion of the strip detached.

Like numerals of reference refer to like parts in the several figures of the drawings.

In the drawings, 1 indicates the body proper of my improved chest, 2 the cover, said body and cover being formed of any suitable material and configuration desired. Arranged within the corners of the chest are corner posts 3 provided with vertical grooves 4 and 5 adapted to receive perforated sheets of metal or wood 6 forming the lining of the chest, said lining being spaced from the inner face of the walls of the chest proper by vertical strips 7. The bottom of the chest is provided with a rectangular frame 8 formed of strips having a central transverse strip 9 and spaced strips 10 forming a support for the perforated sheet metal bottom 11, said bottom and side lining sheets being secured in position by screws passing through the lining into the strips as clearly shown. The side and end strips of the lining rest upon the bottom of the chest 1 and abut against the frame arranged within the bottom of the chest so as to form a chamber practically surrounding the walls of the chest into which chamber is placed the insect repelling substance, as shown at 12, which is preferably cedar shavings or cedar sawdust. The chamber formed by the frame in the bottom is also adapted to be filled with the same material. The corner posts 3 terminate short of the upper edge of the chest and form supports for closing strips 13 which are provided with rabbeted edges 14 to receive the upper edges of the perforated sheets of metal forming the sides and ends of the lining. Binding strips 15 are arranged over the edge of the bottom sheet 11 in order to form a tight joint between the sides and bottom and by simply removing these strips, the bottom sheet may be raised upwardly in order to allow the renewal of the insect repelling substance. The closing strips 13 are mounted loosely upon the corner posts and the upper edges are flush with the upper edges of the chest and by this manner of mounting the closing strips, they may be readily detached, thereby permitting the renewal of the insect repelling substance.

The cover 2 is provided with a flange 16 which fits snugly around the walls of the casing and arranged on the under face of the cover 2 is a rectangular frame 17 formed of strips and having a central transverse strip 18 and longitudinal strips 19 in order to form a support for the perforated sheet metal or wood lining 20 which is secured in position by binding strips 21 and screws as clearly shown in order to form a chamber in which the insect repelling substance may be placed. In the modification shown in Figs. 6 and 7, the binding strip 14' is grooved at 22, instead of being rabbeted, to receive the upper edge of the sheet metal lining 6.

From the foregoing description, it will be seen that I have provided a chest with a perforated lining spaced from the walls of the chest forming a receptacle to receive the articles to be stored which is practically surrounded by walls of insect repelling substance, so as to afford protection against insects. It will also be seen that the cover is adapted to fit tightly over the chest.

Having described my invention and set forth its merits, what I claim and desire to secure by Letters Patent is—

1. An insect proof chest comprising a casing having corner posts provided with vertical grooves, strips secured to the inner face of said casing, perforated sheets arranged in the grooves of said corner posts bearing against said strips forming a chamber surrounding the inner walls of said casing, an insect repelling substance arranged within said chamber, and detachable strips mounted on said corner posts for closing said chamber.

2. A chest having corner posts arranged therein provided with vertical grooves, strips secured to the inner face of said chest, perforated sheets arranged on said strips extending into said grooves of the corner posts, an insect repelling substance arranged within the chamber formed by said perforated sheets, and cover strips arranged on said corner posts having rabbeted edges to receive the upper edges of said sheets.

3. An insect proof chest comprising a body and a cover, the inner walls of said body and cover having strips secured thereto, corner posts arranged in said body and provided with vertical grooves in alinement with the outer faces of the strips on the sides and ends of said body, perforated sheets arranged on said strips forming a chamber, the sheets on the sides and ends of said body extending into the grooves of said posts, an insect repelling substance arranged in said chamber formed by said sheets, and cover strips arranged on the corner posts having cut out portions to receive the upper edges of the perforated sheets carried by the sides and ends of the body.

4. An insect proof chest comprising a body and cover therefor, corner posts arranged in the body of said chest provided with vertical grooves, strips arranged at right angles to each other on the inner faces of said body, perforated sheets arranged in the grooves of said posts and resting upon said strips, the bottom of said chest and the top of said cover being provided with strips, perforated sheets arranged on said strips, said strips and posts and perforated sheets forming a chamber entirely surrounding the inner faces of said chest, means for closing the chamber formed by the vertical perforated sheets, and an insect repelling substance arranged in said chambers.

In testimony whereof I affix my signature in presence of two witnesses.

GEORGE R. WILSON.

Witnesses:
 HARVEY F. PARKER,
 J. H. COOK.